US008123958B2

(12) United States Patent
Fukuyo et al.

(10) Patent No.: US 8,123,958 B2
(45) Date of Patent: Feb. 28, 2012

(54) METHOD FOR TREATING SHIP BALLAST WATER

(75) Inventors: Yasuo Fukuyo, Tokyo (JP); Yoshiharu Wakao, Osaka (JP); Takuro Tabuchi, Osaka (JP); Takashi Mizumori, Osaka (JP); Takeaki Kikuchi, Tokyo (JP)

(73) Assignees: Katayama Chemical, Inc., Osaka (JP); The Japan Association of Marine Safety, Tokyo (JP); Marine Technology Institute Co., Ltd., Saga (JP); Laboratory of Aquatic Science Consultant Corporation, Tokyo (JP); M.O. Marine Consulting, Ltd., Tokyo (JP); Mitsui Engineering & Shipbuilding Co., Ltd., Tokyo (JP); Shinko Ind. Ltd., Hiroshima (JP)

( * ) Notice: Subject to any disclaimer, the term of this patent is extended or adjusted under 35 U.S.C. 154(b) by 303 days.

(21) Appl. No.: 11/884,443

(22) PCT Filed: Feb. 17, 2006

(86) PCT No.: PCT/JP2006/302880
§ 371 (c)(1),
(2), (4) Date: May 26, 2009

(87) PCT Pub. No.: WO2006/088156
PCT Pub. Date: Aug. 24, 2006

(65) Prior Publication Data
US 2009/0294382 A1   Dec. 3, 2009

(30) Foreign Application Priority Data

Feb. 18, 2005   (JP) .................................. 2005-042670

(51) Int. Cl.
*C02F 1/72* (2006.01)

(52) U.S. Cl. ...................... 210/759; 210/764; 210/242.1
(58) Field of Classification Search .................. 210/758, 210/759, 764, 200, 201, 202, 205, 219, 242.1; 366/340, 167.1, 174.1, 175.2, 176.1
See application file for complete search history.

(56) References Cited

U.S. PATENT DOCUMENTS 5,256,423 A   10/1993   Egusa et al.

FOREIGN PATENT DOCUMENTS

| JP | 63-100995 A | 5/1988 |
|---|---|---|
| JP | 1-94997 A | 4/1989 |
| JP | 4-322788 A | 11/1992 |
| JP | 5-910 A | 1/1993 |
| JP | 2695071 B2 | 9/1997 |
| JP | 11-216497 A | 6/1999 |
| JP | 2002-86155 A | 3/2002 |
| JP | 2003-200156 A | 7/2003 |
| JP | 2004-42040 A | 2/2004 |
| JP | 2004-188240 A | 7/2004 |
| JP | 2005-246198 A | 9/2005 |
| JP | 2006-7184 A | 1/2006 |

OTHER PUBLICATIONS

Machine translation of JP 2003-200156 to Kino et al., Jul. 2003 (obtained from JPO Oct. 2010).*
Extended European Search Report, dated Feb. 18, 2011, for European Application No. 06714021.0.
Jyoti et al., "Hybrid cavitation methods for water disinfection: simultaneous use of chemicals with cavitation", Ultrasonics Sonochemistry, vol. 10, No. 4-5, Jul. 1, 2003, pp. 255-264, XP004431631.
Jyoti et. al, "Effect of cavitation on chemical disinfection efficiency", Water Research, vol. 38, No. 9, May 1, 2004, pp. 2248-2257, XP004508314.

* cited by examiner

*Primary Examiner* — Nam Nguyen
*Assistant Examiner* — Lucas Stelling
(74) *Attorney, Agent, or Firm* — Birch, Stewart, Kolasch & Birch, LLP

(57) ABSTRACT

A method for treating ship ballast water in which aquatic organisms in the ship ballast water are exterminated by adding hydrogen peroxide or a compound producing hydrogen peroxide in an amount such that a hydrogen peroxide concentration comes to be 10 to 500 mg/L to the ship ballast water, and then providing physical means for causing shear strength and/or cavitation to the ship ballast water.

6 Claims, No Drawings

METHOD FOR TREATING SHIP BALLAST WATER

TECHNICAL FIELD

The present invention relates to a method for treating ship ballast water which is capable of exterminating aquatic organisms living in the ship ballast water in a convenient and sure manner.

BACKGROUND ART

When a ship is loaded with no cargo or a small quantity of cargo, the ship becomes difficult to maintain its equilibrium because the water line is lowered. Therefore, such a ship is loaded with sea water or fresh water as ballast water to assure safe navigation thereof in the ocean. The ballast water is taken into the ship before the ship departs from an unloading port and is discharged out of the ship before the ship comes into a loading port or at the time of loading a cargo.

The sea water or the fresh water as the ballast water is taken into a watertight compartment constructed inside the ship by a pump or the like and held there. On this occasion, various types of microorganisms such as plankton and bacteria and aquatic animal such as minute shells living in the water intake area are taken in. By discharging such ballast water as described above, for example, along the coast near the loading port or in the harbor, there is caused a problem of damaging ecosystems in a surrounding ocean area. Further, since the ballast water is held for a long period of time in a closed light-shielded condition, an amount of dissolved oxygen is decreased. By discharging such ballast water as having a poor oxygen (reduced) condition, there is caused a concern that a deleterious effect may be given to organisms in the surrounding ocean area.

As described above, since the ballast water is held for a long period of time in a dark reduced condition, plankton or aerobic bacteria which require light or dissolved oxygen are hardly viable in the ballast water and cyst in which plankton is in a dormant state or anaerobic bacteria tend to multiply. The cyst has an extremely high durability as an exterior wall thereof has an extremely hard structure, which is completely different from a cell wall membrane of the plankton.

Under these circumstances, the present applicant has proposed a method for destroying cyst of noxious plankton by maintaining such an amount of hydrogen peroxide or a compound producing hydrogen peroxide as being effective in destroying the cyst of the noxious plankton in ship ballast water (Japanese Examined Patent Publication No. 2695071: Patent Document 1).

Further, there has been proposed a method for sterilizing ship ballast water by killing cyst of noxious algae by adding a chlorine type bactericide or hydrogen peroxide to the ship ballast water (Japanese Unexamined Patent Publication No. HEI 4(1992)-322788: Patent Document 2). However, in a case in which the chlorine type bactericide is added, a trihalomethane is generated in the ship ballast water, to thereby generate a concern about an environmental problem.

Further, there has been proposed a device for killing microorganisms in liquids by utilizing a shearing phenomenon present in the inside of a turbulent flow in a liquid (Japanese Unexamined Patent Publication No. 2003-200156: Patent Document 3). However, in the device, while an effect to organisms such as plankton has been obtained to some extent, no sufficient effect to bacteria and the like has been obtained.
Patent Document 1: Japanese Examined Patent Publication No. 2695071
Patent Document 2: Japanese Unexamined Patent Publication No. HEI 4(1992)-322788
Patent Document 3: Japanese Unexamined Patent Publication No. 2003-200156

DISCLOSURE OF INVENTION

Problems to be Solved by the Invention

It is an object of the present invention to provide a method for treating ship ballast water, which can exterminate various types of organisms in the ship ballast water, namely, zooplankton, phytoplankton, cyst in which plankton is in a dormant state, microorganisms such as bacteria and an aquatic animal such as a minute shell in a convenient and sure manner, does not allow a chemical component to remain in the treated ballast water, can safely discharge the ship ballast water, allows an amount of dissolved oxygen to be appropriate, does not give any deleterious effect to organisms living in the surrounding ocean area in which the ship ballast water is discharged and has a high degree of safety.

Means for Solving the Problems

The present inventors, as a result of eager studies to achieve the above object, have unexpectedly found that all aquatic organisms in ship ballast water can be exterminated, the dissolved oxygen in the ship ballast water can be maintained in an appropriate amount and, further, hydrogen peroxide in the ballast water is dissolved rapidly by adding hydrogen peroxide or a compound producing hydrogen peroxide to the ship ballast water and then providing physical means for causing shear strength and/or cavitation to the ship ballast water, and have accomplished the invention.

Thus, the present invention provides a method for treating ship ballast water, in which aquatic organisms in the ship ballast water are exterminated by adding to the ship ballast water hydrogen peroxide or a compound producing hydrogen peroxide in an amount such that a hydrogen peroxide concentration comes to be 10 to 500 mg/L and then providing physical means for causing shear strength and/or cavitation to the ship ballast water.

In the invention, "aquatic organisms" mean aquatic microorganisms and marine microorganisms including zooplankton, phytoplankton, cyst in which plankton is in a dormant state and microorganisms such as bacteria and the like; and organisms such as a minute shell and the like.

Effect of the Invention

According to the present invention, all organisms including aquatic organisms living in the ship ballast water, namely, zooplankton, phytoplankton, cyst in which plankton is in a dormant state, microorganisms such as bacteria and an aquatic animal such as a minute shell can be exterminated in a convenient and sure manner. Further, according to the present invention, an added chemical is not allowed to remain in the treated ship ballast water, an amount of dissolved oxygen is appropriate, any deleterious effect is not given to organisms in the surrounding ocean area, and the ship ballast water which has become unnecessary can be discharged into the sea without concern.

BEST MODE FOR CARRYING OUT THE INVENTION

Hydrogen peroxide is a secure compound capable of being easily decomposed into water and oxygen in water.

Examples of hydrogen peroxide to be used in the present invention include a hydrogen peroxide solution having a concentration of 3 to 60% which is normally available for industrial use.

The term "a compound producing hydrogen peroxide" (referred to also as "a compound supplying hydrogen peroxide") means a compound capable of producing hydrogen peroxide in water and includes inorganic peracids such as percarbonic acid, perboric acid and peroxysulfuric acid; organic peracids such as peracetic acid; and per salts thereof. As for such salts, sodium percarbonate and sodium perborate are mentioned.

At the time of adding any one of these compounds into the ship ballast water, hydrogen peroxide or the compound producing hydrogen peroxide (hereinafter, referred to also as "hydrogen peroxides") may appropriately be diluted or dissolved by sea water or fresh water so as to be in a desired concentration, and then, used.

Further, hydrogen peroxide produced in water including sea water or fresh water can also be used. As for a method of producing hydrogen peroxide in water, a method of electrochemically decomposing water or an alkaline solution, a method of irradiating water with a high-energy ray such as an ultraviolet ray or a radiation ray or a method of metabolism of an aquatic animal, for example "*Poecillia vellifere* (Cyprinodontiformes, Poeciliidae)" can be mentioned.

In the method of the invention, hydrogen peroxides are added to the ship ballast water at first in such an amount that a concentration of hydrogen peroxide comes to be 10 to 500 mg/L, preferably 10 to 300 mg/L.

In a case in which the concentration of hydrogen peroxide is less than 10 mg/L, the aquatic organisms in the ballast are not sufficiently exterminated; accordingly, the case is not preferred. Further, in a case in which the concentration of hydrogen peroxide is more than 500 mg/L, the effect of extermination of the organisms corresponding to the quantity thereof to be added can not be expected and hydrogen peroxide sometimes remains after treating the ship ballast water; accordingly the case is not preferred.

In the method of the invention, physical means for causing shear strength and/or cavitation to the ship ballast water is then provided. The physical means contributes to the enhancement of the effect of exterminating aquatic organisms by the addition of hydrogen peroxides, maintenance of dissolved oxygen in the ballast water, and decomposition of the hydrogen peroxides after the treatment.

"Cavitation" means herein a phenomenon caused by a formation and an elimination of bubbles generated due to the local increase of a flow rate in the liquid and lowering of the pressure to less than the saturation pressure of the liquid.

The physical means for causing the shear strength and/or cavitation is not particularly restricted and known methods can also be used.

The physical means for causing the shear strength includes, for example, means of disposing at least one slit plate having a plurality of slit-like through holes in the transversal cross sectional direction of a water channel of the ship ballast water and causing the ship ballast water to pass through the slit plate.

For example, it is preferred to dispose a plurality of slit plates to the water channel of the ship ballast water in the shape of a pipe since this can effectively generate the shear strength.

In a case of disposing the plurality of slit plates in the water channel, the plate thickness, the slit width, the slit pitch, the distance between each of adjacent slits, the direction of the slits can be properly set depending on various conditions such as a shape of the water channel.

While these dimensions are not particularly restricted, in a case where the pipe inner diameter is 100 mm, the plate thickness is about 3 to 10 mm, the slit width is about 0.1 to 1 mm, the slit pitch is about 3 to 10 mm, and the distance between each of adjacent slits is about 5 to 15 mm for the slit plate.

For example, it is preferred that the plurality of slit plates are disposed such that opening portions and closed portions of the slit plates are not arranged on a straight line relative to the flowing direction of the ship ballast water since the shear strength can be generated efficiently with this arrangement. Specifically, examples thereof include a method of disposing a plurality of slit plates so that the opening portions of the slits are not aligned, displaced in parallel with the direction of the longitudinal axes of the slits, a method of disposing a plurality of slit plates of different slit widths and slit pitches or a method of disposing a plurality of slit plates such that the directions of the longitudinal axes of the slit opening portions are in perpendicular to each other.

The physical means for causing the shear strength includes, more specifically, a pipe having slit plates (two plates, plate thickness: 4 mm, slit width: 0.3 mm, slit pitch: 4 mm, distance between each of adjacent slits: 5 mm) (Special Pipe manufactured by Japan Association of Marine Safety, pipe inner diameter: 50 mm, pipe effective length: 80 mm).

As in the slit plate disposed to the pipe, the slit plate may have a mechanism of moving forward and backward in the flowing direction of the ballast water to remove cloggings in the slit.

Further, as the physical means for causing the cavitation, various kinds of commercially available micro bubble generation devices can be used suitably.

In the method of the invention, while the hydrogen peroxides may be added to sea water or fresh water either before and/or after providing of the physical means to the sea water or the fresh water, it is preferred to add the physical means to the sea water or the fresh water in a stage after pumping up the sea water or the fresh water and addition of hydrogen peroxides thereto and before injecting the same into a ballast tank, thereby causing shear strength and/or cavitation to the sea water or the fresh water with addition of the hydrogen peroxides in view of the effect of exterminating the aquatic organisms.

Further, it is preferred to keep the ship ballast water after conducting the treatment by the method of the invention at least for three hours (for example, 3 to 40 hours) since aquatic organisms in the ship ballast water, particularly, cyst having a strong durability can surely be exterminated.

The keeping time may appropriately be selected depending, for example, on the concentration of the hydrogen peroxides upon addition, temperature of the ballast water and the kind and the amount of the aquatic organisms living in the ballast water. Ordinarily, the ballast water after the treatment may be kept for a long time in a case where the concentration of the hydrogen peroxide to be added is low and for a short time in a case where it is high. In a case in which the time for keeping the ship ballast water after the treatment is less than 3 hours, the aquatic organisms in the ship ballast water are not sufficiently exterminated; accordingly, this case is not preferred. Further, even in a case in which the time period for allowing hydrogen peroxide to be in contact with the ship ballast water is more than 40 hours, the effect corresponding to such period can not be expected; accordingly, this case is not preferred. Still further, in a case in which the temperature of the ship ballast water is as low as 15° C. or less, it is preferable to perform the treatment at a high concentration for a long period of time.

Ordinarily, ships require from 1 to 2 weeks or more in ocean-going navigation, and from several hours to several tens of hours in navigation in the seas close to Japan. Therefore, the concentration of the hydrogen peroxides to be added or the keeping time after the treatment may appropriately be selected in accordance with the navigation period of time or the temperature condition.

Still further, the method according to the present invention can be performed in appropriate combination with other existing methods for treating ship ballast water, for example, heating, steam injection and ultraviolet ray irradiation.

Further, after providing the physical means to the ship ballast water, it is preferred to add at least one type selected from a ferrous ion or a compound supplying ferrous ion in an amount such that a ferrous ion concentration comes to be 0.1 to 400 mg/L, catalase in an amount such that a concentration of catalase comes to be 0.01 to 50 mg/L and iodine or a compound supplying iodine in an amount such that an iodine concentration comes to be 0.1 to 100 mg/L. They act as a decomposing aid for hydrogen peroxide to promote decomposition of the hydrogen peroxide in the ship ballast water.

As for the ferrous ion or the compound supplying ferrous ion, compounds such as ferrous sulfate, ferrous chloride and ammonium ferrous sulfate, which are soluble in water and capable of forming a divalent iron ion in water can be mentioned. At the time of adding any one of these compounds into the ballast water, the ferrous ions may appropriately be diluted or dissolved by sea water or fresh water so as to be in a desired concentration, and then, used.

The addition concentration is about 0.1 to 400 mg/L as the ferrous ion concentration.

Catalase is an enzyme which catalyzes a reaction of decomposing hydrogen peroxide and is rich in amount in a liver, a kidney and blood erythrocytes of animals such as a cow and a pig. Further, catalase can be obtained by culturing bacteria such as *Aspergillus niger* and *Micrococcus lysodeikticus*. According to the present invention, the resultant cultured article or the extract of the cultured article can be used, and the molecular weight thereof is preferably about from 100,000 to 500,000. At the time of adding any one of these articles into the ship ballast water, catalase may appropriately be diluted or dissolved by sea water or fresh water so as to be in a desired concentration, and then, used.

The addition concentration is about 0.01 to 50 mg/L.

The term "a compound supplying iodine" means a compound which is soluble in water and can form an iodine ion in water and includes potassium iodide and ammonium iodide. At the time of adding any one of these compounds into the ballast water, iodine or the compound supplying iodine may appropriately be diluted or dissolved by sea water or fresh water so as to be in a desired concentration, and then, used.

The addition concentration is about 0.1 to 100 mg/L.

EXAMPLE

The present invention will be hereinafter described in detail with reference to the test examples as described below, but these examples are not to be construed to limit the scope of the invention.

Test Example 1

Test for Confirming the Ability of Maintaining Dissolved Oxygen Concentration in Sea Water Sea water (pH: 8.0, temperature: 16° C., and salt concentration: 3.2%) was sampled at a certain place in Saga prefecture, and injected into a tank of 1-ton capacity. While the sea water in the tank was being passed through a flexible tube and drawn at a flow rate of 300 L/min, hydrogen peroxide (aqueous solution, 45% by weight) was added from an injection port formed to the tube. The sea water was then passed at a flow rate of 300 L/min through a pipe having slit plates (two plates, plate thickness: 4 mm, slit width: 0.3 mm, slit pitch: 4 mm, and distance between each adjacent slits: 5 mm) (Special Pipe manufactured by Japan Association of Marine Safety, pipe inner diameter: 50 mm, and pipe effective length: 80 mm), covered with a light screening sheet, and stored in a tank of 500-liter capacity stood still at a room temperature.

Sea water drawn for one min from the start of storage (about 300 liters) was discarded and a test was conducted by using the treated sea water stored thereafter.

The treated sea water was sampled with lapse of time in a beaker of 2-liter volume as test sea water, and the dissolved oxygen concentration in the test sea water (mg/L) was measured by a dissolved oxygen meter (manufactured by Horiba Ltd., Model U-10).

For comparison, the test was conducted in the same manner also for a case where the sea water was not passed through the Special Pipe.

The obtained results are shown in Table 1 together with chemicals served for the test and the presence or absence of passage of Special Pipe (SP). The concentration of the chemicals used for the test is shown by the effective ingredient concentration.

TABLE 1

| Test chemical (mg/L) Hydrogen peroxide | Presence or absence of passage of SP | Dissolved oxygen concentration (mg/L) Elapsed time (hr) | | | | | | |
|---|---|---|---|---|---|---|---|---|
| | | 0 | 6 | 24 | 48 | 72 | 120 | 192 |
| 25 | presence | 9.5 | 9.9 | 10.4 | 11.1 | 11.6 | 14.8 | 16.2 |
| 50 | presence | 10.1 | 10.7 | 11.1 | 12.4 | 12.9 | 17.3 | 18.9 |
| 50 | absence | 10.1 | 9.8 | 9.6 | 9.7 | 9.7 | 10.9 | 11.2 |
| 100 | presence | 10.1 | 10.7 | 11.2 | 12.9 | 12.8 | 16.6 | 19.8 |
| 100 | absence | 10.1 | 9.9 | 9.9 | 10.2 | 10.5 | 10.5 | 10.4 |
| 0 | presence | 9.3 | 9.3 | 9.1 | 8.7 | 8.7 | 8.4 | 7.6 |
| 0 | absence | 9.5 | 9.4 | 9.8 | 8.8 | 8.6 | 8.3 | 7.5 |

From Table 1, it can be seen that the concentration of dissolved oxygen was high in the sea water with addition of hydrogen peroxide at the specified concentration and with provision of the physical means by Special Pipe.

Test Example 2

Test for Confirming the Decomposition Property of Hydrogen Peroxide

Sea water (pH: 8.0, temperature: 16° C., and salt concentration: 3.2%) was sampled at a certain place in Saga prefecture, and injected into a tank of 1-ton capacity. While the sea water in the tank was being passed through a flexible tube and drawn at a flow rate of 300 L/min, hydrogen peroxide (aqueous solution, 45% by weight) was added from an injection port formed to the tube. The sea water was then passed at a flow rate of 300 L/min through a pipe identical with that of Test Example 1, covered with a light screening sheet and stored in a tank of 500-liter capacity stood still at a room temperature. In a case of adding ferrous chloride as the decomposing aid used for the test, an aqueous solution of ferrous chloride was added from the injection port formed to the tube connected to the exit side of the pipe.

Sea water drawn for one min from the start of storage (about 300 liters) was discarded and a test was conducted using the treated sea water stored thereafter.

The treated sea water was sampled with lapse of time in a beaker of 2-liter volume as test sea water, and the concentration of hydrogen peroxide in the test sea water (mg/L) was measured by the potassium permanganate method.

The obtained results are shown in Table 2 together with the chemicals used for the test and the presence or absence of passage through Special Pipe (SP). The concentration of the chemicals used for the test is shown by the effective ingredient concentration for hydrogen peroxide and by the ferrous ion concentration for ferrous chloride.

TABLE 2

| Test chemical (mg/L) | | Presence or absence of passage of SP | Hydrogen peroxide concentration (mg/L) Elapsed time (hr) | | | | | | |
|---|---|---|---|---|---|---|---|---|---|
| Hydrogen peroxide | Ferrous chloride | | 0 | 6 | 24 | 48 | 72 | 120 | 192 |
| 50 | 0 | presence | 58.1 | 53.3 | 51.0 | 47.4 | 42.7 | 28.5 | 5.8 |
| 50 | 0 | absence | 59.3 | 56.9 | 54.5 | 53.3 | 53.3 | 49.8 | 9.6 |
| 100 | 0 | presence | 92.4 | 90.1 | 85.3 | 80.6 | 75.8 | 66.4 | 47.7 |
| 100 | 60 | presence | 61.6 | 59.3 | 53.3 | 47.4 | 41.5 | 35.6 | 22.9 |
| 100 | 0 | absence | 92.4 | 91.2 | 90.1 | 85.3 | 85.3 | 85.3 | 76.4 |

From Table 2, it can be seen that in the sea water with addition of hydrogen peroxide at the specified concentration and with provision of the physical means by Special Pipe, the decomposition of hydrogen peroxide proceeds and the decomposition of hydrogen peroxide proceeds further by the addition of ferrous chloride.

Test Example 3

Test for Confirming the Effect of Bactericide

Sea water (pH: 8.0, temperature: 16° C., and salt concentration: 3.2%) was sampled at a certain place in Saga prefecture, and injected into a tank of 1-ton capacity. While the sea water in the tank was being passed through a flexible tube and drawn at a flow rate of 300 L/min, hydrogen peroxides (aqueous solution 45% by weight) or (containing peracetic acid: 6% by weight, hydrogen peroxide: 8% by weight) were added from an injection port formed to the tube. The sea water was then passed at a flow rate of 300 L/min through the pipe identical with that of Test Example 1, covered with a light screening sheet and stored in a tank of 500-liter capacity stood still at a room temperature. In a case of adding ferrous chloride as the decomposing aid used for the test, an aqueous solution of ferrous chloride was added from the injection port formed to the tube connected to the exit side of the pipe.

Sea water drawn for one min from the start of storage (about 300 liters) was discarded and a test was conducted using the treated sea water stored thereafter.

The treated sea water was sampled with lapse of time to a desterilized container as test sea water and the number of marine bacteria, the number of terrestrial bacteria, and the number of coli groups in the test sea water were counted as the number of living bacteria by a plate method (n=5, unit: N/mL). As the culture medium for marine bacteria and terrestrial bacteria, Marine Agar 2216 medium (manufactured by Difco Co.) and nutrient agar medium (manufactured by Difco Co.) were used respectively and they were cultured at 20° C. for 48 hours. Further, as the medium for the coli groups, X-GAL medium (manufactured by Nissui Seiyaku Co.) was used and they were cultured at 36° C. for 24 hours.

The results obtained for the number of marine bacteria, the number of terrestrial bacteria, and the number of coli groups are shown in Tables 3 to 5 together with the chemicals used for the test and the presence or absence of passage in Special Pipe (SP) respectively. The concentration of the chemicals used for the test was indicated by the effective ingredient concentration for hydrogen peroxide and peracetic acid by the ferrous ion concentration for ferrous chloride.

TABLE 3

| Test chemical (mg/L) | | | Presence or absence of passage of SP | Number of living bacteria (number/100 mL) Elapsed time (hr) | | | |
|---|---|---|---|---|---|---|---|
| Hydrogen peroxide | Peracetic acid | Ferrous chloride | | 0 | 6 | 24 | 48 |
| 25 | 0 | 0 | presence | $5.0 \times 10^3$ | $3.9 \times 10^2$ | $1.4 \times 10$ | $1.5 \times 10^2$ |
| 50 | 0 | 0 | presence | $6.3 \times 10^2$ | $1.8 \times 10$ | $1.8 \times 10$ | 4.0 |
| 50 | 0 | 30 | presence | $1.2 \times 10$ | $1.4 \times 10$ | 8.0 | 4.0 |
| 100 | 0 | 0 | presence | 0 | 0 | 0 | 2.0 |
| 100 | 0 | 60 | presence | $1.5 \times 10^3$ | $3.6 \times 10$ | 0 | 0 |
| 4 | 3 | 0 | presence | 8.0 | 0 | $1.0 \times 10$ | $1.1 \times 10^2$ |
| 8 | 6 | 0 | presence | 2.0 | 0.0 | 4.0 | 8.0 |
| 8 | 6 | 7.5 | presence | 4.0 | 2.0 | 0.0 | 8.0 |
| 16 | 12 | 0 | presence | $2.0 \times 10$ | $1.0 \times 10$ | $3.4 \times 10$ | $2.2 \times 10$ |
| 16 | 12 | 15 | presence | 0 | 0 | 4.0 | 0 |
| 0 | 0 | 0 | presence | $1.5 \times 10^4$ | $3.1 \times 10^4$ | $9.3 \times 10^4$ | $7.2 \times 10^4$ |
| 0 | 0 | 0 | absence | $1.3 \times 10^4$ | $3.5 \times 10^4$ | $4.2 \times 10^4$ | $1.5 \times 10^4$ |

TABLE 4

| Test chemical (mg/L) | | | Presence or absence of passage of SP | Number of living bacteria (number/100 mL) Elapsed time (hr) | | | |
|---|---|---|---|---|---|---|---|
| Hydrogen peroxide | Peracetic acid | Ferrous chloride | | 0 | 6 | 24 | 48 |
| 25 | 0 | 0 | presence | 24 | 6 | 0 | 8 |
| 50 | 0 | 0 | presence | 38 | 6 | 2 | 2 |
| 4 | 3 | 0 | presence | 6 | 4 | 6 | 0.2 |
| 8 | 6 | 0 | presence | 8 | 2 | 4 | 4 |
| 16 | 12 | 0 | presence | 34 | 6 | 18 | 2 |
| 16 | 12 | 15 | presence | 2 | 2 | 2 | 0 |
| 0 | 0 | 0 | presence | 300 | 190 | 190 | 142 |
| 0 | 0 | 0 | absence | 354 | 172 | 196 | 90 |

TABLE 5

| Test chemical (mg/L) | | | Presence or absence of passage of SP | Number of living bacteria (number/100 mL) Elapsed time (hr) | | | |
|---|---|---|---|---|---|---|---|
| Hydrogen peroxide | Peracetic acid | Ferrous chloride | | 0 | 6 | 24 | 48 |
| 25 | 0 | 0 | presence | 2800 | 0 | 0 | 0 |
| 50 | 0 | 0 | presence | 600 | 0 | 0 | 0 |
| 50 | 0 | 0 | presence | 600 | 0 | 0 | 0 |
| 100 | 0 | 0 | presence | 200 | 0 | 0 | 0 |
| 100 | 0 | 60 | presence | 0 | 0 | 0 | 0 |
| 100 | 0 | 0 | presence | 0 | 0 | 0 | 0 |
| 0 | 0 | 0 | presence | 1800 | 2000 | 800 | 2400 |
| 0 | 0 | 0 | absence | 1800 | 1400 | 800 | 400 |

From Tables 3 to 5, it can be seen that the number of living bacteria was decreased in the sea water with addition of hydrogen peroxide at the specified concentration and with provision of the physical means by Special Pipe.

The present invention is related to Japan Patent Application No. 2005-42670 filed on Feb. 18, 2005, whose priory is claimed and the disclosure of which is incorporated by reference in its entirety.

The invention claimed is:

1. A method for treating ship ballast water in which aquatic organisms in the ship ballast water are exterminated, said method comprising:
adding hydrogen peroxide or a compound producing hydrogen peroxide in an amount such that a hydrogen peroxide concentration comes to be 10 to 500 mg/L in the ship ballast water,
providing a physical means comprising at least two slit plates having a plurality of slit-like through holes defined by opening portions and closed portions of the slit plates, the at least two slit plates disposed in a traversal cross sectional direction of a water channel of the ship ballast water such that the opening portions of the at least two slit plates are not arranged in a straight line relative to a flowing direction of the ship ballast water in the water channel and the closed portions of the at least two slit plates are not arranged in a straight line relative to the flowing direction of the ship ballast water in the water channel, and wherein the opening portions of the at least two slit plates are located in parallel with the direction of longitudinal axes of the slit-like through holes, and then
causing the ship ballast water to pass through said physical means, thereby causing shear strength and cavitation to the ship ballast water.

2. The method for treating the ship ballast water according to claim 1, wherein the ship ballast water the physical means is kept at least for three hours in a ballast tank.

3. The method for treating the ship ballast water according to claim 1, wherein the ship ballast water the physical means is kept for 3 to 40 hours in a ballast tank.

4. The method for treating the ship ballast water according to claim 1, wherein,
when hydrogen peroxide is used, the hydrogen peroxide is an aqueous hydrogen peroxide for industrial use at a concentration of 3 to 60%, and
when a compound producing hydrogen peroxide is used, the compound producing hydrogen peroxide is a member selected from the group consisting of percarbonic acid, perboric acid, peroxy sulfuric acid, peracetic acid, sodium percarbonate, and sodium perborate.

5. The method for treating the ship ballast water according to claim 1, wherein said hydrogen peroxide concentration is 10 to 300 mg/L.

6. The method for treating the ship ballast water according to claim 1, wherein at least one member selected from the group consisting of
a ferrous ion or a compound supplying ferrous ion in an amount such that a ferrous ion concentration comes to be 0.1 to 400 mg/L,
catalase in an amount such that a concentration of catalase comes to be 0.01 to 50 mg/L, and
iodine or a compound supplying iodine in an amount such that an iodine concentration comes to be 0.1 to 100 mg/L
is further added to the ship ballast water the physical means.

* * * * *